United States Patent
Yamai et al.

(10) Patent No.: US 10,372,280 B2
(45) Date of Patent: Aug. 6, 2019

(54) CAPACITIVE SENSOR

(71) Applicant: ALPS ALPINE CO., LTD., Ota-ku, Tokyo (JP)

(72) Inventors: Tomoyuki Yamai, Tokyo (JP); Mitsuo Bito, Tokyo (JP); Yasuyuki Kitamura, Tokyo (JP); Yuta Hiraki, Tokyo (JP); Setsuo Ishibashi, Tokyo (JP); Manabu Yazawa, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 18 days.

(21) Appl. No.: 15/642,459

(22) Filed: Jul. 6, 2017

(65) Prior Publication Data
US 2017/0308206 A1 Oct. 26, 2017

Related U.S. Application Data

(63) Continuation of application No. PCT/JP2015/080503, filed on Oct. 29, 2015.

(30) Foreign Application Priority Data

Jan. 16, 2015 (JP) ................................. 2015-007252

(51) Int. Cl.
*G06F 3/041* (2006.01)
*G06F 3/044* (2006.01)
(Continued)

(52) U.S. Cl.
CPC .............. *G06F 3/044* (2013.01); *B32B 15/02* (2013.01); *G02F 1/13338* (2013.01);
(Continued)

(58) Field of Classification Search
CPC combination set(s) only.
See application file for complete search history.

(56) References Cited

U.S. PATENT DOCUMENTS

| 5,963,277 A * | 10/1999 | Kim | ...................... G06F 3/0412 |
| | | | 349/12 |
| 6,204,897 B1 * | 3/2001 | Colgan | ............... G02F 1/13338 |
| | | | 349/111 |

(Continued)

FOREIGN PATENT DOCUMENTS

| JP | 2010-191504 | 9/2010 |
| JP | 2014-182436 | 9/2014 |
| JP | 2015-018494 | 1/2015 |

OTHER PUBLICATIONS

International Search Report for PCT/JP2015/080503 dated Jan. 12, 2016.

*Primary Examiner* — Pegeman Karimi
(74) *Attorney, Agent, or Firm* — Hunton Andrews Kurth LLP

(57) ABSTRACT

A capacitive sensor includes a base material provided with a pattern of a light-transmissive conductive film. The light-transmissive conductive film contains metal nanowires. The pattern includes a detection pattern formed of a plurality of detection electrodes arranged with intervals and a plurality of lead-out wirings linearly extending in a first direction from the corresponding ones of the plurality of the detection electrodes. At least one of the detection electrodes of the detection pattern includes a current path-setting section for elongating the linear path length of the current from the detection electrode toward the lead-out wiring.

9 Claims, 4 Drawing Sheets

(51) Int. Cl.
    *B32B 15/02*     (2006.01)
    *G02F 1/1333*     (2006.01)

(52) U.S. Cl.
    CPC ...... *G06F 3/0416* (2013.01); *B32B 2307/202* (2013.01); *B32B 2307/412* (2013.01); *B32B 2457/208* (2013.01); *G06F 2203/04112* (2013.01)

(56) References Cited

U.S. PATENT DOCUMENTS

| | | | |
|---|---|---|---|
| 6,670,949 B1 * | 12/2003 | Ahn | G06F 3/045 178/18.03 |
| 8,237,672 B2 | 8/2012 | Jiang et al. | |
| 9,791,988 B2 * | 10/2017 | Hashida | G06F 1/16 |
| 2003/0086048 A1 * | 5/2003 | Ukita | G02F 1/1345 349/149 |
| 2007/0206146 A1 | 9/2007 | Wang | |
| 2011/0075089 A1 * | 3/2011 | Jheng | G02F 1/1345 349/152 |
| 2015/0370379 A1 | 12/2015 | Hayashi et al. | |
| 2016/0124550 A1 | 5/2016 | Tada et al. | |
| 2016/0253035 A1 * | 9/2016 | Mitamura | B32B 7/12 345/174 |

\* cited by examiner

CAPACITIVE SENSOR

CLAIM OF PRIORITY

This application is a Continuation of International Application No. PCT/JP2015/080503 filed on Oct. 29, 2015, which claims benefit of Japanese Patent Application No. 2015-007252 filed on Jan. 16, 2015. The entire contents of each aforementioned application is incorporated herein by reference.

BACKGROUND OF THE INVENTION

1. Field of the Invention

The present invention relates to a capacitive sensor provided with a pattern of a light-transmissive conductive film containing metal nanowires.

2. Description of the Related Art

Japanese Unexamined Patent Application Publication No. 2010-191504 discloses a touch switch of a capacitive sensor including a transparent conductive film having a monolayer structure. The touch switch disclosed in Japanese Unexamined Patent Application Publication No. 2010-191504 is composed of a touch electrode section and a wiring section of a meshed metal wire extending from the touch electrode. This touch switch configuration can be realized in compact touch panels, but in large-size panels, a large number of thin and long wirings are required to be arrayed. In addition, since the wiring section is made of a metal wire, the electrical resistance of the wiring section increases with lengthening and thinning the wiring section.

Japanese Unexamined Patent Application Publication No. 2009-146419 discloses a touch panel including a plurality of transparent conductive structures formed on a surface of a substrate. The conductive structures are each constituted of carbon nanotubes, and a conductive wire formed of indium tin oxide (ITO) extends from the conductive structure.

The conductive wire made of ITO or the like has increased electrical resistance, and the detection sensitivity is therefore decreased due to the increased electrical resistance of the conductive wire.

In order to solve such a problem, films containing metal nanowires have been studied as light-transmissive conductive films having low resistance.

However, a case using metal nanowires in a light-transmissive conductive film having a monolayer structure has a problem in that the electrostatic discharge (ESD) tolerance is low compared with the case using ITO. The reasons thereof are, for example, (1) a light-transmissive conductive film containing metal nanowires has low electrical resistance compared with ITO, (2) even in the same pattern, a larger amount of current readily flows in ESD, (3) metal nanowires express conductivity in nano-size connection and therefore melt at a lower temperature compared with the melting point of the bulk metal (melt with the heat when a lot of current flows in a short time), and (4) the actual volume itself being in a conductive state is small.

SUMMARY OF THE INVENTION

The present invention provides a capacitive sensor that can have sufficient ESD tolerance, even if a light-transmissive conductive film containing metal nanowires is employed.

In order to solve the above-mentioned problems, the capacitive sensor of the present invention includes a base material provided with a pattern of a light-transmissive conductive film. The capacitive sensor is characterized in that the light-transmissive conductive film contains metal nanowires and that the pattern includes a detection pattern of a plurality of detection electrodes arranged with intervals and a plurality of lead-out wirings linearly extending from corresponding ones of the plurality of the detection electrodes in a first direction and that at least one of the detection electrodes of the detection pattern includes a current path-setting section for elongating the linear path length of the current from the detection electrode toward the lead-out wiring. According to such a configuration, the linear current path length from the detection electrode to the lead-out wiring is elongated by disposing the current path-setting section, and thereby the current is prevented from instantaneously flowing into the lead-out wiring and the ESD tolerance can be enhanced.

In the capacitive sensor of the present invention, the current path-setting section may have a slit pattern provided so as to obstruct the straight line connecting the periphery of the detection electrode and the connection portion between the detection electrode and the lead-out wiring. In such a configuration, the current flowing from the detection electrode to the lead-out wiring meanders so as to avoid the slit pattern. Consequently, the current is prevented from instantaneously flowing into the lead-out wiring and the ESD tolerance can be enhanced.

In the capacitive sensor of the present invention, the current path-setting section may have a plurality of slit patterns having a length of a half or more of the length of the detection electrode and restricting the current path, the plurality of the slit patterns may be disposed parallel to each other, at least a part of the plurality of the slit patterns may inward extend from the end of the detection electrode, and adjacent ones of the slit patterns may restrict the current path at positions different from each other. In such a configuration, the current flowing from the detection electrode to the lead-out wiring greatly meanders so as to avoid the plurality of the slit patterns. Consequently, the current is prevented from instantaneously flowing into the lead-out wiring and the ESD tolerance can be enhanced.

In the capacitive sensor of the present invention, the plurality of the lead-out wirings may have an equal-interval region where the lead-out wirings are arrayed with a constant first pitch in a second direction orthogonal to the first direction, and the current path-setting section may include a plurality of slit patterns extending from the end of the detection electrode by a half or more of the length of the detection electrode in the first direction.

In such a configuration, since the equal-interval region of the plurality of the lead-out wirings and the pattern of the current path-setting section are constituted of linear portions extending in the same directions, it is difficult to visually recognize the difference in the patterns even if the current path-setting section is disposed.

In the capacitive sensor of the present invention, the widths of the plurality of the slit patterns may be the same as the intervals of the plurality of the lead-out wirings, and the pitch of the plurality of the slit patterns may be the same as the first pitch.

In such a configuration, the lines and spaces of the equal-interval region of the plurality of the lead-out wirings are substantially the same as those of the current path-setting section, which makes visual recognition of the difference in the patterns further difficult.

In the capacitive sensor of the present invention, the first direction may be the direction toward an external terminal region from the detection pattern, the plurality of the detection electrodes may be arranged in the first direction, and the current path-setting section may be at least provided to the detection electrode closest to the external terminal region. In such a configuration, the current is prevented from instantaneously flowing into the lead-out wiring having the lowest ESD tolerance, i.e., the lead-out wiring of which the length from the detection electrode to the external terminal region is the shortest, and the ESD tolerance can be enhanced.

In the capacitive sensor of the present invention, the current path-setting section may be provided to each of the plurality of the detection electrodes. According to such a configuration, the ESD tolerance of the wiring patterns extracted from corresponding ones of the plurality of the detection electrodes can be equalized.

In the capacitive sensor of the present invention, the metal nanowires may include silver nanowires. According to such a configuration, the pattern of the light-transmissive conductive film containing silver nanowires can have enhanced ESD tolerance.

DESCRIPTION OF THE PREFERRED EMBODIMENTS

Figure 1:
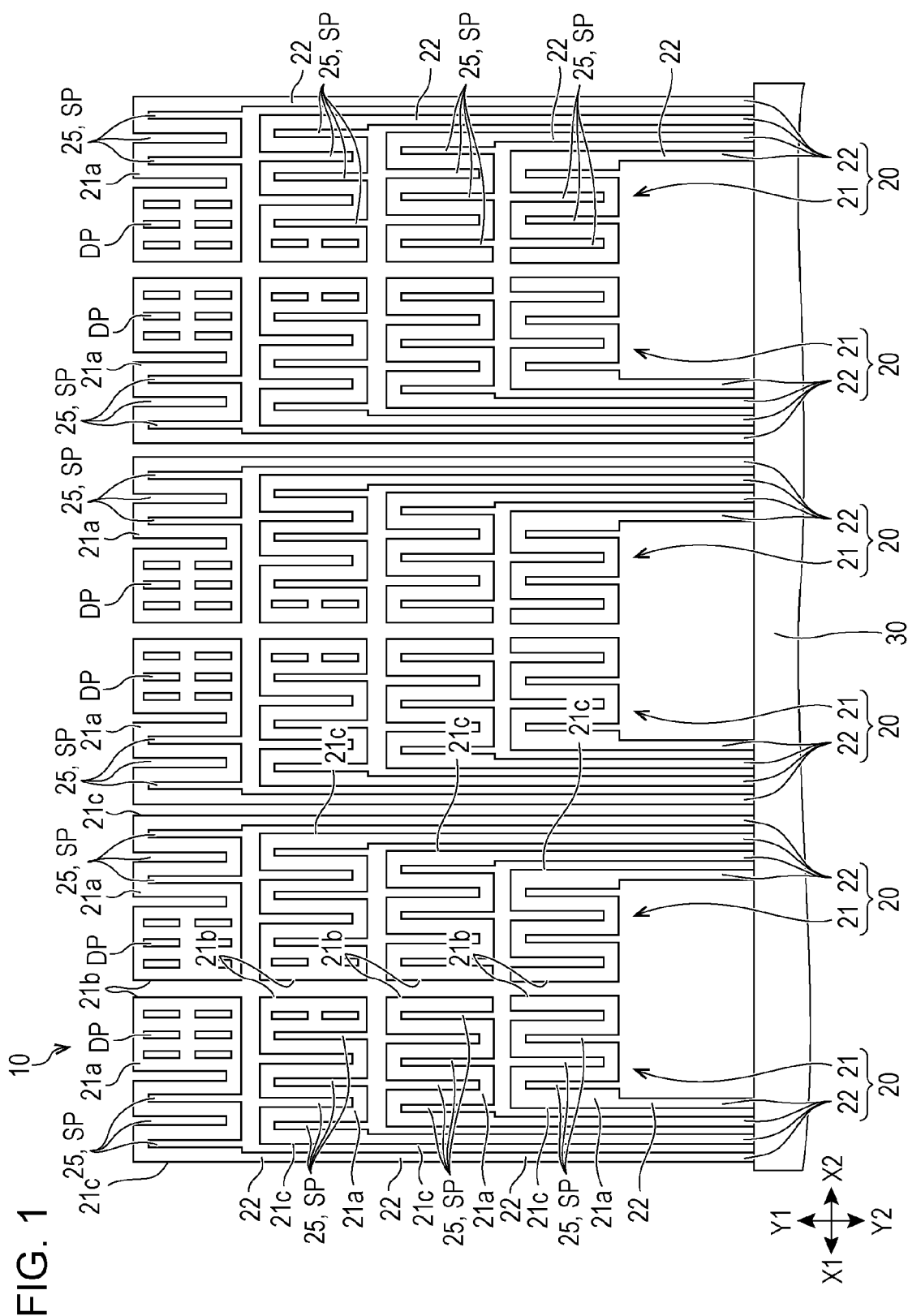
FIG. 1 is a plan view illustrating an example of the conductive pattern of a capacitive sensor according to an embodiment.

Embodiments of the present invention will now be described based on the drawings. In the following descriptions, the same members are designated with the same reference numerals, and explanations of members once described are appropriately omitted.

Configuration of Capacitive Sensor

FIG. 1 is a plan view illustrating an example of the conductive pattern of a capacitive sensor according to an embodiment.

As shown in FIG. 1, the capacitive sensor according to the embodiment has a configuration in which patterns 20 of a light-transmissive conductive film having a monolayer structure are provided on a film base material as an example of a base material 10. The patterns 20 each include a detection pattern 21 and a lead-out wiring 22.

The base material 10 may be made of any material. Examples of the material of the base material 10 include inorganic substrates having light transmissivity and plastic substrates having light transmissivity. The base material 10 may have any form. Examples of the form of the base material 10 include films, sheets, and plates, and the shape may have a flat surface or a curved surface. Examples of the material of the inorganic substrate include quartz, sapphire, and glass. Examples of the material of the plastic substrate include polyesters, such as polyethylene terephthalate (PET) and polyethylene naphthalate (PEN); polyolefins, such as polyethylene (PE), polypropylene (PP), and cycloolefin polymers (COPs); cellulose resins, such as diacetyl cellulose and triacetyl cellulose (TAC); acrylic resins, such as polymethyl methacrylate (PMMA); polyimides (PIs); polyamides (PAs); aramids; polyether sulfones; polysulfones; polyvinyl chlorides; polycarbonates (PCs); epoxy resins; urea resins; urethane resins; and melamine resins. The base material 10 may have a monolayer structure or may have a layered structure.

The detection pattern 21 includes a plurality of square detection electrodes 21a. The detection electrodes 21a are arranged at regular intervals in the X1-X2 direction (second direction) and the Y1-Y2 direction (first direction). The first direction and the second direction are orthogonal to each other. FIG. 1 is a schematic diagram for simplification, and the areas of the plurality of the detection electrodes 21a are equal to each other.

The plurality of the lead-out wirings 22 extend from the ends on the Y2 side of the detection electrodes 21a so as to be parallel to each other along the same direction (Y1-Y2 direction). More specifically, the lead-out wirings 22 extend from the ends of the detection electrodes 21a on the Y2 side of the second vertical sides 21c toward the external terminal region 30.

At least one of the detection electrodes of the detection pattern has a current path-setting section 25. The current path-setting section 25 includes a wiring path that allows the path of current flowing from the detection electrode 21a toward the lead-out wiring 22 to meander. In the embodiment, a plurality of slit patterns SP are disposed for constituting the wiring path. Consequently, the current flowing from the detection electrode 21a toward the lead-out wiring 22 follows a path meandering for avoiding the slit patterns SP.

The current path-setting section 25 is preferably at least included in the detection electrode 21a closest to the external terminal region 30. That is, in the detection electrode 21a closest to the external terminal region 30, the lead-out wiring 22 is also the shortest. Accordingly, the current is prevented from instantaneously flowing into the shortest lead-out wiring by disposing the current path-setting section 25 in the detection electrode 21a, and the ESD tolerance can be enhanced. In the example shown in FIG. 1, the current path-setting section 25 is included in each of the detection electrodes 21a. The ESD tolerance of the lead-out wirings 22 extracted from corresponding ones of the detection electrodes 21a can be equalized by providing the current path-setting section 25 to each of the detection electrodes 21a.

When a plurality of slit patterns SP are provided as the current path-setting section 25, it is desirable that the slit patterns SP extend by a half or more of the length of the detection electrode 21a and be disposed parallel to each other and that adjacent ones of the slit patterns SP extend in directions different from each other. Consequently, the current flowing from the detection electrode 21a to the lead-out wiring 22 greatly meanders for avoiding the slit patterns SP. The increase in the current path can prevent the current from instantaneously flowing into the lead-out wiring 22 and can enhance the ESD tolerance.

Figure 2A:
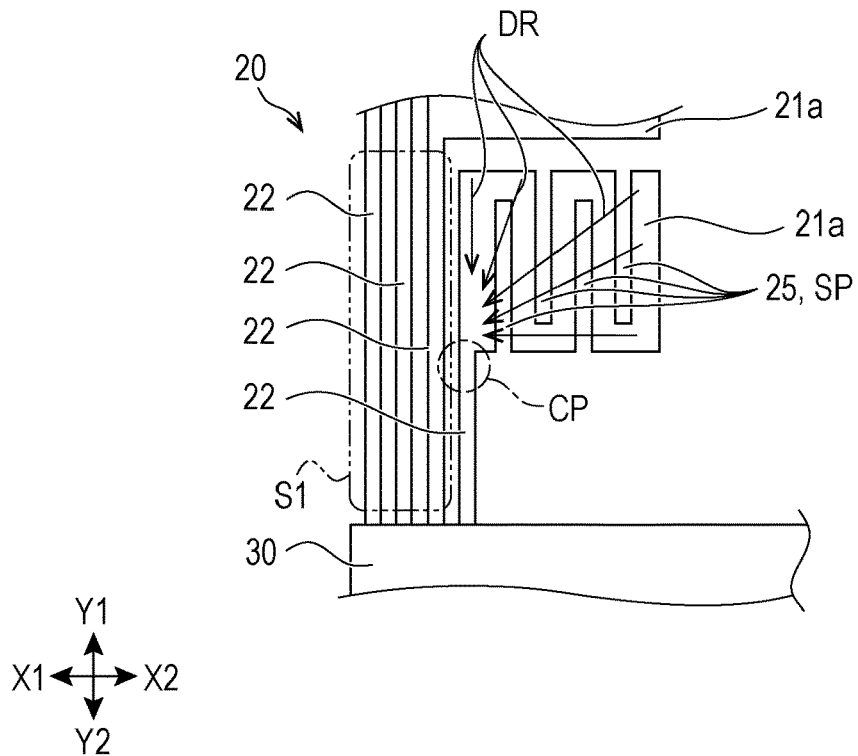
FIGS. 2A and 2B are schematic views showing an example of a relationship between a slit pattern and a current path.
Figure 2B:
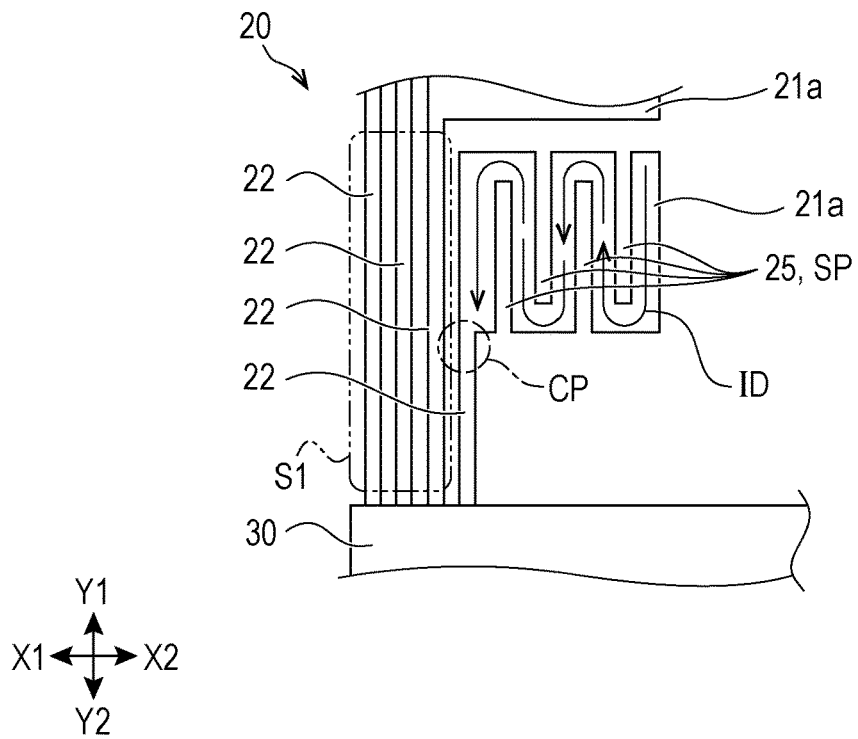

FIGS. 2A and 2B are schematic views showing examples of a relationship between a slit pattern and a current path.

FIG. 2A shows an example of the extension direction of the slit pattern SP, and FIG. 2B shows the current path. For convenience of explanation, FIGS. 2A and 2B each show only a part of the pattern 20.

Herein, in FIG. 2A, the current toward the lead-out wiring 22 from the detection electrode 21a flows along the lines (arrows DR in FIG. 2A) connecting the periphery of the detection electrode 21a and the connection portion CP between the detection electrode 21a and the lead-out wiring 22. If the current path-setting section 25 is not disposed, the current flows linearly along the arrows DR into the connection portion CP. In the lead-out wiring 22, the current concentrates and flows from the wide region of the detection electrode 21a to the narrow region of the lead-out wiring 22.

Accordingly, in this embodiment, slit patterns SP are disposed as the current path-setting section 25 so as to obstruct the straight lines (arrows DR). The plurality of the slit patterns SP are also parallel to each other and extend alternately. That is, each slit pattern SP is disposed so as to extend from the end (edge) of the detection electrode 21a toward the inside and to have a length that is a half or more of the length of the detection electrode 21a and does not reach the opposite edge. Furthermore, adjacent ones of the slit patterns SP alternately extend in different directions.

When the slit patterns SP are thus disposed, as shown in FIG. 2B, the current from a position in the detection electrode 21a far from the connection portion CP toward the lead-out wiring 22 flows along the zigzag path for avoiding the plurality of the slit patterns SP. Consequently, the current is prohibited from instantaneously flowing from the detection electrode 21a to the lead-out wiring 22 and cannot linearly flow toward the connection portion CP. Consequently, the current is prevented from intensively flowing into the connection portion CP and the lead-out wiring 22 within a short time. Accordingly, in the embodiment, the ESD tolerance at the lead-out wiring 22 is enhanced, compared with the case not including the current path-setting section 25 in the detection electrode 21a.

Herein, in the current path-setting section 25 including the plurality of the slit patterns SP, the slit patterns SP may be disposed so as to align with the equal-interval region S1 where the plurality of the lead-out wirings 22 are aligned parallel to the Y1-Y2 direction. In the equal-interval region S1, the plurality of the lead-out wirings 22 are arrayed with a constant pitch (first pitch) in the X1-X2 direction. In the current path-setting section 25, the widths of the slit patterns SP are adjusted to be equal to the intervals of the plurality of the lead-out wirings 22, and the pitch is adjusted to be equal to the first pitch. As a result, the configuration includes a linear portion where the equal-interval region S1 of the plurality of the lead-out wirings 22 and the pattern of the current path-setting section 25 extend in the same direction. Consequently, even in observation from an angle at which the intensity of reflection/scattering from the pattern edge of the linear portion of the equal-interval region S1 is increased, the intensity of reflection/scattering in the linear portions of the current path-setting section 25 is similarly increased. Therefore, the difference in ease of visual recognition is decreased, and the difference in pattern becomes difficult to be visually recognized even if the slit pattern SP is disposed. In addition, since the lines and spaces of the equal-interval region S1 of the lead-out wirings 22 are substantially the same as those of the current path-setting section 25, the difference in the intensity of reflection/scattering is further decreased, and the difference in the intensity of transmitted light is also decreased. Accordingly, the difference in pattern becomes further difficult to be visually recognized even if the slit pattern SP is disposed.

Detection Operation

In the capacitive sensor according to the embodiment, capacitance is formed between adjacent ones of the detection electrodes 21a. If a finger is brought into contact with or is brought near the surface of a detection electrode 21a, capacitance is formed between the finger and the detection electrode 21a near the finger. Accordingly, measurement of the current value detected from the detection electrodes 21a allows to detect which electrode of the plurality of the detection electrodes 21a is closest to the finger.

Constituent Material

The light-transmissive conductive film forming the pattern 20 contains conductive metal nanowires. The metal nanowires may be made of any material. Examples of the material of the metal nanowires include materials containing one or more metal elements selected from Ag, Au, Ni, Cu, Pd, Pt, Rh, Ir, Ru, Os, Fe, Co, and Sn. The metal nanowires may have any average minor axis diameter, and the average minor axis diameter of the metal nanowires is preferably larger than 1 nm and not larger than 500 nm. The metal nanowires may have any average major axis diameter, and the average major axis diameter of the metal nanowires is preferably larger than 1 μm and not larger than 1000 μm.

In order to improve the dispersibility of the metal nanowires in a nanowire ink forming the light-transmissive conductive film, the metal nanowires may be surface-treated with an amino group-containing compound, such as polyvinylpyrrolidone (PVP) and polyethyleneimine. The compound for the surface treatment is preferably used in an amount of not deteriorating the conductivity when formed into a coating film. In addition, a compound having a functional group and being adsorbable to a metal may be used as a dispersant. Examples of the functional group include a sulfo group (including sulfonate), a sulfonyl group, a sulfonamide group, a carboxylic acid group (including carboxylate), an amide group, a phosphoric acid group (including phosphate and phosphate ester), a phosphino group, a silanol group, an epoxy group, an isocyanate group, a cyano group, a vinyl group, a thiol group, and a carbinol group.

The dispersant for the nanowire ink may be of any type. Examples of the dispersant for the nanowire ink include water, alcohols (e.g., methanol, ethanol, n-propanol, i-propanol, n-butanol, i-butanol, sec-butanol, and tert-butanol), ketones (e.g., cyclohexanone and cyclopentanone), amides (e.g., N,N-dimethylformamide (DMF)), and sulfoxides (e.g., dimethylsulfoxide (DMSO)). The dispersant for the nanowire ink may be composed of one material or may be composed of a plurality of materials.

In order to prevent uneven drying of the nanowire ink and cracking, the evaporation rate of the solvent may be controlled by further adding a high boiling point solvent. Examples of the high boiling point solvent include butyl cellosolve, diacetone alcohol, butyl triglycol, propylene glycol monomethyl ether, propylene glycol monoethyl ether, ethylene glycol monoethyl ether, ethylene glycol monopropyl ether, ethylene glycol monoisopropyl ether, diethylene glycol monobutyl ether, diethylene glycol monoethyl ether, diethylene glycol monomethyl ether, diethylene glycol diethyl ether, dipropylene glycol monomethyl ether, tripropylene glycol monomethyl ether, propylene glycol monobutyl ether, propylene glycol isopropyl ether, dipropylene glycol isopropyl ether, tripropylene glycol isopropyl ether, and methyl glycol. The high boiling point solvents may be used alone or in combination of two or more thereof.

The binder material applicable to the nanowire ink can be widely selected from known transparent natural and synthetic polymer resins. For example, a transparent thermoplastic resin or a transparent curable resin that is cured by heat, light, electron beam, or radiation can be used. Examples of the transparent thermoplastic resin include polyvinyl chloride, vinyl chloride-vinyl acetate copolymers, polymethyl methacrylate, nitrocellulose, chlorinated polyethylene, chlorinated polypropylene, vinylidene fluoride, ethyl cellulose, and hydroxypropyl methyl cellulose. Examples of the transparent curable resin include melamine acrylate, urethane acrylate, isocyanate, epoxy resins, polyimide resins, and silicone resins, such as acrylic modified silicate. The nanowire ink may further contain an additive. Examples of the additive include surfactants, viscosity modifiers, dispersants, curing accelerating catalysts, plasticizers, and stabilizers, such as antioxidants and sulfidation inhibitors.

Other Examples of Current Path-Setting Section

Other examples of the current path-setting section 25 will now be described.

Figure 3A:
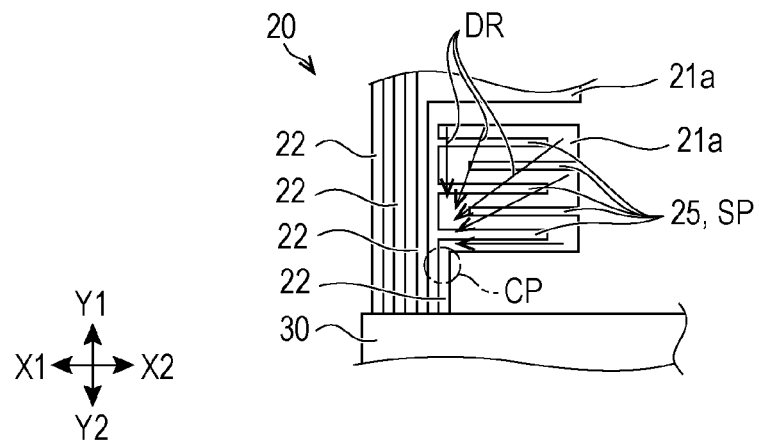
FIGS. 3A to 3C are plan views illustrating other examples of the current path-setting section.
Figure 3B:
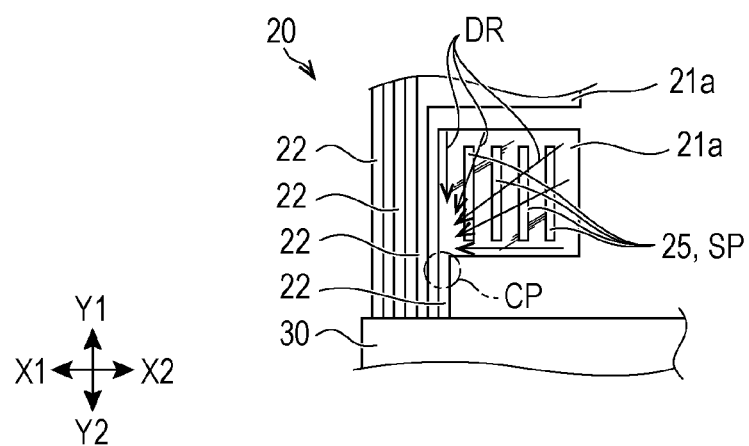
Figure 3C:
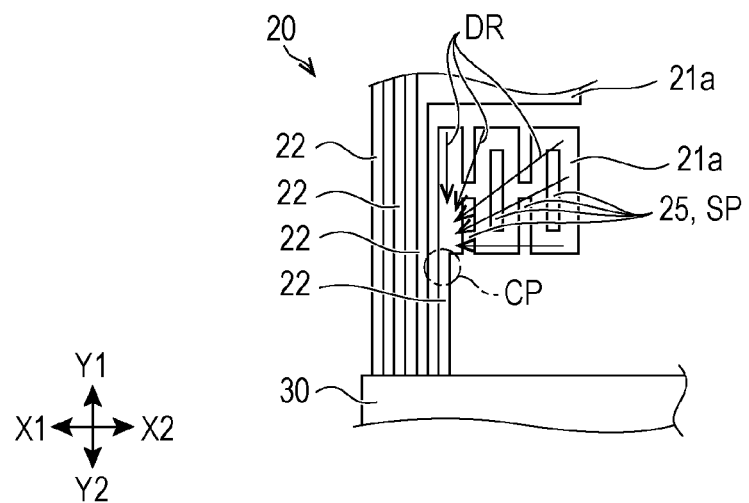

FIGS. 3A to 3C are plan views illustrating other examples of the current path-setting section. For convenience of explanation, FIGS. 3A to 3C each show only a part of the pattern 20.

In the example shown in FIG. 3A, the plurality of the slit patterns SP extending in the X1-X2 direction are included in the current path-setting section 25. The slit patterns SP may be disposed so as to obstruct straight lines (arrows DR) connecting the edge of the detection electrode 21a and the connection portion CP. Accordingly, the extraction direction of the slit pattern SP is not limited to the Y1-Y2 direction and may be the X1p-X2 direction. Alternatively, the slit pattern SP may extend in a direction not parallel to both the X1-X2 direction and the Y1-Y2 direction. Furthermore, the plurality of the slit patterns SP are not necessarily parallel to each other.

In the example shown in FIG. 3B, the slit patterns SP are disposed in the inside of the detection electrode 21a. That is, both ends of each slit pattern SP do not reach the edges of the detection electrode 21a. The slit patterns SP may be disposed in such a configuration as long as the straight lines (arrows DR) are obstructed.

The slit patterns SP disposed for obstructing the straight lines (arrows DR) can allow the path of current to meander not to linearly flow from the edge of the detection electrode 21a to the connection portion CP and can prevent the current from intensively flowing into the lead-out wiring 22 within a short time. Consequently, the ESD tolerance of the lead-out wiring 22 can be enhanced.

In the example shown in FIG. 3C, the slit patterns SP disposed from the both ends of the detection electrode 21a toward the inside and the slit patterns SP disposed in the inside of the detection electrode 21a (not reaching the edges of the detection electrode 21a) restrict the current path at positions different from each other. Such slit patterns SP also can obstruct the straight lines (arrows DR) and can prevent the current from intensively flowing into the lead-out wiring 22 within a short time. Consequently, the ESD tolerance of the lead-out wiring 22 can be enhanced.

Figure 4:
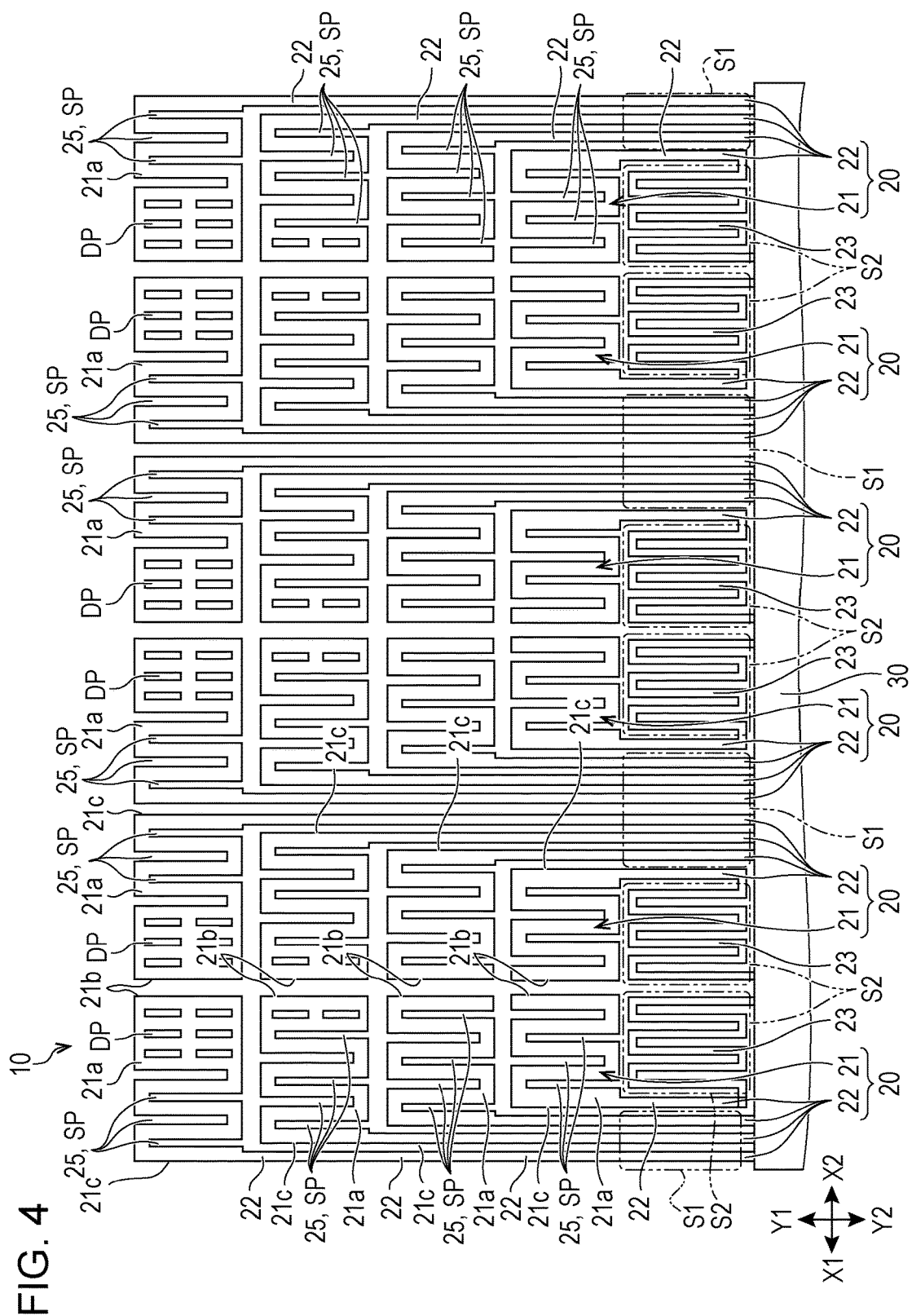
FIG. 4 is a plan view illustrating an example of a pattern including dummy patterns and current path-setting sections.

FIG. 4 is a plan view illustrating an example of a pattern including dummy patterns and current path-setting sections.

The dummy pattern DP is a slit-like pattern provided to each detection electrode 21a. The detection electrode 21a is provided with a plurality of parallel dummy patterns DP extending in the Y1-Y2 direction. A region of lines and spaces of the detection electrode 21a is thus formed.

It is desirable that the width and the pitch of the lines and spaces in each detection electrode 21a formed by the dummy patterns DP coincide with the width and the pitch of the lines and spaces in the equal-interval region S1 of the plurality of the lead-out wirings 22. It is also desirable that the lines and spaces in the equal-interval region S1 be the same as those in the current path-setting section 25. Consequently, lines having the same width and spaces having the same width are disposed in the wide region of the entire pattern 20, which can make the pattern 20 inconspicuous.

Furthermore, a resistance-setting section 23 may be disposed in a non-detection region S2 between the detection electrode 21a closest to the external terminal region 30 and the external terminal region 30. The resistance-setting section 23 is connected to the lead-out wiring 22. The resistance-setting section 23 includes a fold-back pattern.

The current path of the wiring pattern from the detection electrode 21a toward the external terminal region 30 is elongated by disposing the resistance-setting section 23 including the fold-back pattern, compared with the case not disposing the resistance-setting section 23. The electrical resistance is enhanced with an increase in the current path. Accordingly, the lead-out wiring 22 provided with the resistance-setting section 23 has higher electrical resistance, compared with the case not disposing the resistance-setting section 23, and the ESD tolerance can be enhanced.

When the resistance-setting section 23 is disposed, it is also desirable that the width and the pitch of the lines and spaces of the fold-back pattern coincide with the width and the pitch of the lines and spaces in the equal-interval region S1. Consequently, a discomfort feeling in light transmission is not caused even if the fold-back pattern is disposed.

Although embodiments and modification examples thereof have been described above, the present invention is not limited thereto. For example, those obtained by appropriate addition of components, deletion, or change in design of the above-described embodiments and modification examples thereof by those skilled in the art and those obtained by appropriate combinations of features of the embodiments and the modification examples are also included in the scope of the present invention as long as they have the gist of the present invention.

As described above, the capacitive sensor according to the present invention is useful for large touch panels including light-transmissive conductive films having a monolayer structure, and a light-transmissive pattern that is hardly visually recognized by a user can be formed.

What is claimed is:

1. A capacitive sensor comprising:
   a base material provided with a pattern of a light-transmissive conductive film, wherein
   the light-transmissive conductive film has a structure in which metal nanowires are dispersed in a binder; and
   the pattern includes:
      a detection pattern of a plurality of detection electrodes arranged with intervals; and
      a plurality of lead-out wirings linearly extending in a first direction from corresponding ones of the plurality of the detection electrodes, wherein
         at least one of the detection electrodes of the detection pattern includes a current path-setting section for elongating a linear path length of a current from the detection electrode toward the lead-out wiring;
         the current path-setting section includes a slit pattern disposed to obstruct the linear path length of the current;
         the current path-setting section includes a plurality of slit patterns having a length of a half or more of the length of the detection electrode and restricting the current path;
         the plurality of the slit patterns are disposed parallel to each other;
   at least a part of the plurality of the slit patterns inward extends from the end of the detection electrode; and
      adjacent ones of the slit patterns restrict the current path at positions different from each other;
      the current path-setting section includes a wiring path that allows the path of current flowing from the detection electrode toward the lead-out wiring to meander;

at least one of the detection electrodes including the current path-setting section and the lead-out wiring extending therefrom have a structure in which the metal nanowires are dispersed in a binder and are formed in a detection region;

the plurality of the detection electrodes are arranged in the first direction;

a plurality of pair of one of the detection electrodes and one of the lead-out wirings extending from corresponding one of the detection electrodes are formed so as to be separated from each other;

the plurality of the lead-out wirings in the detection region include an equal-interval region where the lead-out wirings are arrayed with a constant first pitch in a second direction orthogonal to the first direction;

the plurality of the slit patterns have widths equal to the intervals of the plurality of the lead-out wirings; and the pitch of the plurality of the slit patterns is equal to the first pitch.

2. The capacitive sensor according to claim 1, wherein the first direction is a direction toward an external terminal region from the detection pattern; and the current path-setting section is at least disposed to the detection electrode closest to the external terminal region.

3. The capacitive sensor according to claim 2, wherein the current path-setting section is disposed to each of the plurality of the detection electrodes.

4. The capacitive sensor according to claim 3, wherein the metal nanowires include silver nanowires.

5. The capacitive sensor according to claim 2, wherein the metal nanowires include silver nanowires.

6. The capacitive sensor according to claim 1, wherein the current path-setting section is disposed to each of the plurality of the detection electrodes.

7. The capacitive sensor according to claim 6, wherein the metal nanowires include silver nanowires.

8. The capacitive sensor according to claim 1, wherein the metal nanowires include silver nanowires.

9. A capacitive sensor comprising:

a base material provided with a pattern of a light-transmissive conductive film, wherein the light-transmissive conductive film contains metal nanowires; and the pattern includes:

a detection pattern of a plurality of detection electrodes arranged with intervals; and a plurality of lead-out wirings linearly extending in a first direction from corresponding ones of the plurality of the detection electrodes, wherein at least one of the detection electrodes of the detection pattern includes a current path-setting section for elongating a linear path length of a current from the detection electrode toward the lead-out wiring;

the current path-setting section includes a slit pattern disposed for obstructing the linear path length of the current; and the current path-setting section includes a plurality of slit patterns having a length of a half or more of the length of the detection electrode and restricting the current path;

the plurality of the slit patterns are disposed parallel to each other;

at least a part of the plurality of the slit patterns inward extends from the end of the detection electrode;

adjacent ones of the slit patterns restrict the current path at positions different from each other;

the current path-setting section includes a wiring path that allows the path of current flowing from the detection electrode toward the lead-out wiring to meander;

the plurality of the detection electrodes are arranged in the first direction;

a plurality of pair of one of the detection electrodes and one of the lead-out wirings extending from corresponding one of the detection electrodes are formed so as to be separated from each other;

the plurality of the lead-out wirings in the detection region include an equal-interval region where the lead-out wirings are arrayed with a constant first pitch in a second direction orthogonal to the first direction;

the plurality of the slit patterns have widths equal to the intervals of the plurality of the lead-out wirings; and the pitch of the plurality of the slit patterns is equal to the first pitch.

\* \* \* \* \*